United States Patent
Slinger et al.

(10) Patent No.: US 9,495,199 B2
(45) Date of Patent: *Nov. 15, 2016

(54) MANAGEMENT OF BOTTLENECKS IN DATABASE SYSTEMS

(71) Applicant: International Business Machines Corporation, Armonk, NY (US)

(72) Inventors: Nigel G. Slinger, Los Gatos, CA (US); John B. Tobler, San Jose, CA (US); Wen Jie Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 380 days.

This patent is subject to a terminal disclaimer.

(21) Appl. No.: 13/975,927

(22) Filed: Aug. 26, 2013

(65) Prior Publication Data

US 2015/0058865 A1    Feb. 26, 2015

(51) Int. Cl.
| | |
|---|---|
| G06F 9/46 | (2006.01) |
| G06F 9/48 | (2006.01) |
| G06F 9/52 | (2006.01) |
| G06F 11/30 | (2006.01) |
| G06F 11/34 | (2006.01) |

(52) U.S. Cl.
CPC .............. *G06F 9/46* (2013.01); *G06F 9/485* (2013.01); *G06F 9/524* (2013.01); *G06F 11/3003* (2013.01); *G06F 11/3423* (2013.01); *G06F 2201/80* (2013.01); *G06F 2201/81* (2013.01)

(58) Field of Classification Search
None
See application file for complete search history.

(56) References Cited

U.S. PATENT DOCUMENTS

| | | | |
|---|---|---|---|
| 6,990,503 B1 | 1/2006 | Luo et al. | |
| 7,337,290 B2 | 2/2008 | Rajamani et al. | |
| 7,743,382 B2 | 6/2010 | Schumacher et al. | |
| 8,015,454 B1 * | 9/2011 | Harrison | G06F 11/3409 714/47.3 |
| 8,141,087 B2 | 3/2012 | Chauvet et al. | |
| 8,239,369 B2 * | 8/2012 | Levin | G06F 17/30306 707/713 |
| 8,266,111 B2 | 9/2012 | Lin et al. | |
| 8,370,318 B2 | 2/2013 | Chan et al. | |
| 8,423,534 B2 | 4/2013 | Burger et al. | |
| 2003/0135767 A1 * | 7/2003 | Chu | G06F 1/206 713/300 |
| 2004/0236822 A1 * | 11/2004 | Barsness | G06F 11/0751 709/201 |
| 2006/0106926 A1 * | 5/2006 | Kato | G06F 11/3419 709/223 |

(Continued)

*Primary Examiner* — Sisley Kim
(74) *Attorney, Agent, or Firm* — Robert J. Shatto

(57) ABSTRACT

Management is provided for threads of a database system that is subject to a plurality of disparate bottleneck conditions for resources. A monitor thread retrieves, from a first thread, first monitor data for first bottleneck condition of a first type. The monitor thread compares the first monitor data to a trigger level for the first bottleneck condition and then determines, in response to the comparison of the first monitor data to the trigger level, a potential source of the first bottleneck condition. A potential blocker thread is identified based upon the potential source of the first bottleneck condition. The monitor thread retrieves, from the potential blocker thread, second monitor data for a second type of bottleneck condition that is different from the first type of bottleneck condition. Based upon monitor data, a blocking thread is identified, and a particular blocking solution is applied to the blocking thread.

14 Claims, 4 Drawing Sheets

(56) References Cited

U.S. PATENT DOCUMENTS

| | | | |
|---|---|---|---|
| 2006/0161794 A1* | 7/2006 | Chiasson | G06F 1/28 713/300 |
| 2006/0190770 A1* | 8/2006 | Harding | G06F 11/3604 714/38.11 |
| 2007/0157210 A1* | 7/2007 | Inoue | G06F 9/485 718/105 |
| 2008/0228834 A1 | 9/2008 | Burchall et al. | |
| 2009/0271794 A1* | 10/2009 | Zoll | G06F 9/524 718/103 |
| 2010/0180255 A1* | 7/2010 | Chung | G06F 8/443 717/110 |
| 2011/0083138 A1* | 4/2011 | Sivasubramanian | G06F 17/30306 719/328 |
| 2012/0042301 A1* | 2/2012 | Grechanik | G06F 17/30436 717/124 |
| 2015/0058855 A1 | 2/2015 | Slinger et al. | |

\* cited by examiner

MANAGEMENT OF BOTTLENECKS IN DATABASE SYSTEMS

FIELD

This disclosure relates to managing bottlenecks or hangs relating to database systems. In particular, it relates to managing processing threads that may be blocked for multiple different reasons.

BACKGROUND

Databases systems can include computerized functions directed toward providing information storage and retrieval functions. The particular configurations and uses of databases can vary significantly from application to application. One type of database is a relational database, which uses relational techniques for storing and retrieving data. For instance, relational databases can be organized into tables which consist of rows and columns of data.

The complexity of database systems can result in unwanted inefficiencies or even in the database becoming unusable (e.g., the database becomes "hung"). For instance, there can potentially be a large number of requestors seeking to access database content and functions. This access can include the use of physical devices that make up the database, external input/output (I/O) devices, functional operations (e.g., searches or sorts), and others. The receipt of different requests can result in the generation of one or more tasks, which can be assigned to corresponding threads. As the complexity of the database systems increases, the likelihood of any particular thread being significantly delayed increases. Moreover, increased complexity can frustrate the ability to determine the source of the delay and to resolve or fix the source of the delay.

SUMMARY

In certain embodiments of the disclosure, a system's architecture is configured to rapidly detect and identify database hang conditions. The architecture facilitates self-healing and correction for hang conditions. Particular aspects allow for the resolution of hang conditions across different (shared) resource types.

In various embodiments of the disclosure, a method is provided for managing threads designed to access resources of a database system and subject to a plurality of disparate bottleneck conditions for database resources. The method includes activating at least one monitor thread that retrieves, from a first thread, first monitor data (e.g., a wait timestamp) for first bottleneck condition of a first type. The monitor thread compares the first monitor data to a trigger level (e.g., a wait time limit) for the first bottleneck condition and determines, in response to the comparison of the first monitor data to the trigger level, a potential source for the first bottleneck condition. A potential blocker thread is identified based upon the potential source (e.g., thread associated with an immediate resource causing the waiting) for the first bottleneck condition. The monitor thread retrieves, from the potential blocker thread, second monitor data for a second type of bottleneck condition that is different from the first type of bottleneck condition. The monitor thread also identifies, based upon monitor data, a blocking thread, and applies a particular blocking solution to the blocking thread. Consistent with certain embodiments, the identification of the blocking thread can be made by traversing additional potential blocker threads until a final blocking thread is identified. The monitoring thread can also repeat similar steps for additional (or all) threads running the system.

According to embodiments, a system manages threads designed to access resources for a database system and subject to a plurality of disparate bottleneck conditions for resources. The system comprises at least one computer configured to activate at least one monitor thread that is configured to retrieve, from a first thread, first monitor data for first bottleneck condition of a first type. The monitor thread compares the first monitor data to a trigger level for the first bottleneck condition and determines, in response to the comparison of the timing data to the trigger level, a potential source for the first bottleneck condition. A potential blocker thread is identified based upon the potential source for the first bottleneck condition. The monitor thread retrieves, from the potential blocker thread, second monitor data for a second type of bottleneck condition that is different from the first type of bottleneck condition. The monitor thread also identifies, based upon monitor data, a blocking thread, and applies a particular blocking solution to the blocking thread.

Certain embodiments are directed toward a computer program product for managing threads designed to access resources for a database system and subject to a plurality of disparate bottleneck conditions for resources. The computer program product comprising a computer readable storage medium having program code embodied therewith, the program code readable/executable by a computer processor to perform a method. The method includes activating at least one monitor thread that retrieves, from a first thread, first monitor data for first bottleneck condition of a first type. The monitor thread compares the first monitor data to a trigger level for the first bottleneck condition and determines, in response to the comparison of the first monitor data to the trigger level, a potential source for the first bottleneck condition. A potential blocker thread is identified based upon the potential source for the first bottleneck condition. The monitor thread retrieves, from the potential blocker thread, second monitor data for a second type of bottleneck condition that is different from the first type of bottleneck condition. The monitor thread also identifies, based upon monitor data, a blocking thread, and applies a particular blocking solution to the blocking thread.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

Figure 1:
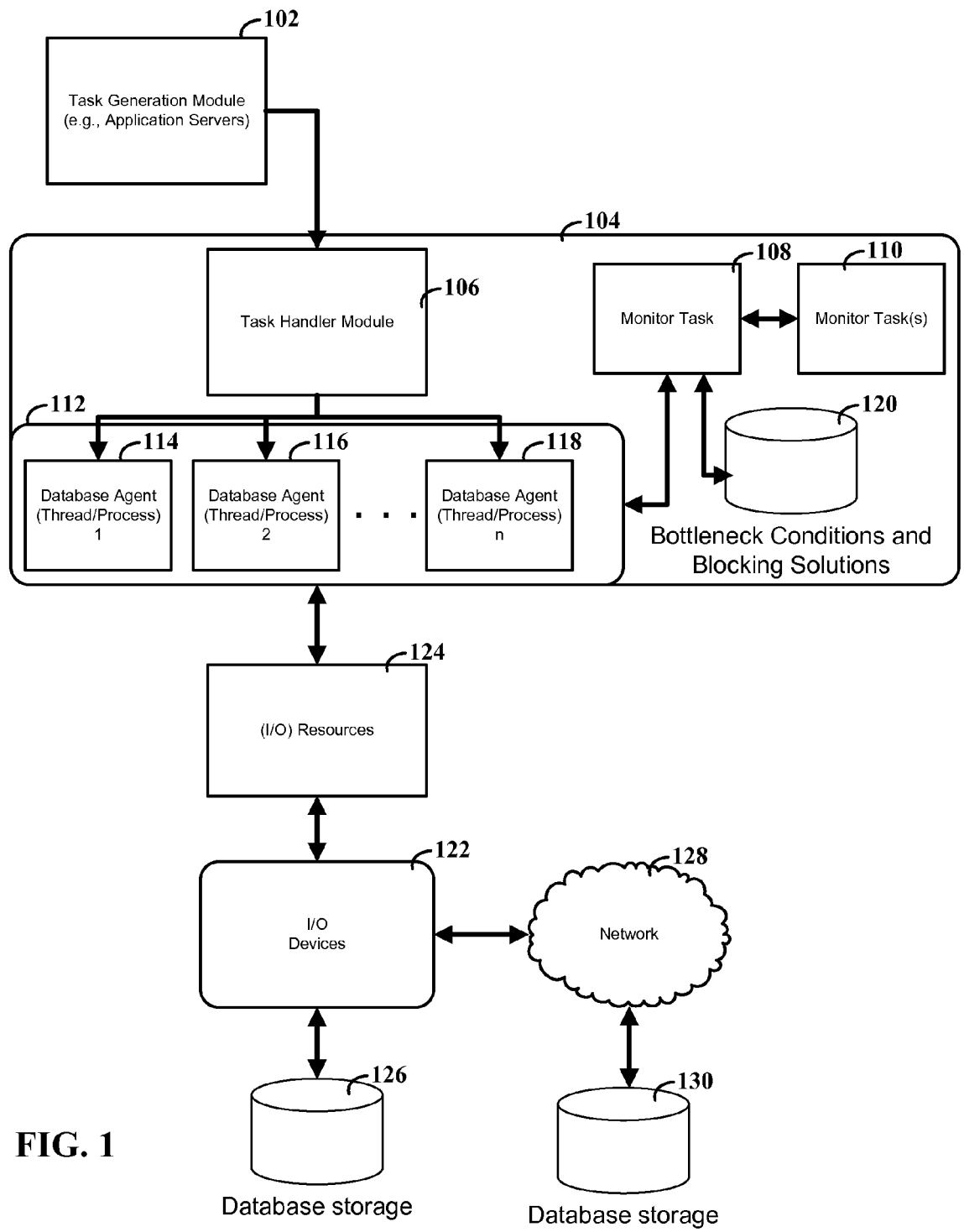
FIG. 1 is a diagram of a system that can detect (and correct for) blocking conditions, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing database hang conditions, more particular aspects relate to detecting and correcting database hang conditions for multiple different types of blocking conditions and/or associated resource types. While the present disclosure is not necessarily limited to such applications, various aspects of the disclosure may be appreciated through a discussion of various examples using this context.

Embodiments of the present disclosure are directed toward managing database systems that are subject to bottlenecks, delays and/or hangs ("blocks"). Particular aspects relate to the identification of a potential source for the block (e.g., latch, lock or queued work) and can also identify the particular thread causing the problem ("blocking thread"). Certain embodiments provide a blocking solution that includes multiple tiers of actions, where an action from each tier has the potential to mitigate, relieve or fix the block.

Certain embodiments are directed toward the detection and solution of blocks that exist at the task and thread level. The system or method can be used to identify potential blocking threads and other blocking sources. Certain embodiments allow for the identification of the likely cause of the block and associated blocking solution(s).

Consistent with various aspects discussed herein, an operating system for a database system can support the use of (physical) threads that are mapped to hardware resources. When access to a particular hardware resource is requested by another program, device or the like, the thread(s) mapped to the hardware resource can used to fulfill the request. A thread can be a unit of work that can run in the database system and can be assigned a dispatching/priority that is managed by the operating system. The term 'agent' can represent the logical entity that is run by a thread.

Certain embodiments are directed toward the creation of a pool of threads that are then repeatedly used to service new requests. For instance, one logical thread can be created per physical thread and can also be assigned to a thread pool. The application can then dynamically schedule computations on to logical threads in the thread pool. Using a thread pool can not only help to match parallelism to hardware resources but can also help to avoid the overhead incurred by repeated creation and destruction of threads. The embodiments discussed herein, however, are not necessarily limited to applications that use thread pools.

While using threads can be useful, systems that implement threads do not always handle blocking events effectively. For instance, if a thread is blocked the resource to which it is assigned may be unavailable for other threads. Blocking can occur for a variety of reasons, including not limited to waiting for access to I/O devices or other shared hardware.

Consistent with certain embodiments, for each database that an application accesses, various processes or threads are started to perform the various application tasks. These tasks can include functions such as logging, communication, sorting and pre-fetching. The database system can also use one or more database agents. Database agents are sometimes referred to as engine dispatchable unit (EDU) processes or threads. Database agents do the work in the database manager that applications request.

Consistent with embodiments, a process can be considered as synonymous with an address space. The operating system can support one or more threads (or dispatchable units) running in a given database process or address space. Certain databases can have multiple (e.g., four) address spaces, while others can also be designed as with a single address space. A database can use its own threads, which can be assigned work or the threads may originate externally. In either case, this may be a thread pool or the thread may be created or destroyed for each access to the database. The database can have a logical agent assigned to do work in the database. This logical agent is linked to a thread in order for the operating system to dispatch and execute work on behalf of the agent.

Agents that are not performing work for applications and that are waiting to be assigned can be assigned to an idle agent pool. These agents are available to service resource requests. When an agent finishes its work but still has a connection to a database, it can be placed in the agent pool. In some embodiments, requests from applications can result in the creation of a new agent. While various embodiments of the present disclosure can be used in connection with database agents and agent pools, aspects the present disclosure can also be used in connection with database systems that do not use database agents or agent pools.

Turning now to the figures, FIG. 1 is a diagram of a system that can detect (and correct for) blocking conditions, consistent with embodiments of the present disclosure. As discussed in more detail herein, the database system 104 can use one or more monitor tasks or threads 108, 110 to detect and/or correct for issues relating to blocking threads or processes within the database system. In particular embodiments, the monitor tasks 108, 110 can apply algorithms that are designed to detect a task or thread that exhibits a blocking condition and to identify potential sources for the blocking condition as well as other threads or tasks that may be associated with the potential sources. In certain embodiments, the detection and identification can be accomplished by retrieving monitor data for blocked thread(s), where the monitor data can include information such as the amount of time the thread has waited for the block or the immediate resource that the thread is waiting upon.

The monitor tasks 108, 110 can also apply algorithms designed to apply blocking solutions that can fix or mitigate identified blocking conditions. In certain embodiments, the blocking solutions can included a tiered set of actions, with different tiers having applicability to different types of blocking conditions and sources. In some instances, the blocking solutions can overlap in applicability to some blocking conditions. Certain blocking solutions having a higher likelihood of mitigation and some blocking solutions may have more potential for undesired consequences (e.g., termination of a database system may solve many blocking solutions, while requiring the database instance to be restarted).

Embodiments of the present disclosure are directed toward running the monitor task 108 at a high system priority level. This can be particularly useful for conditions where the monitor task 108 might otherwise be adversely affected by blocking conditions of other threads having high priorities. Certain embodiments allow for additional monitor tasks 110 to be run as failover task for the (primary) monitor task 108. These additional monitor tasks 110 can check the status of monitor task 108 at regular intervals (or based upon trigger events) and respond accordingly.

Consistent with various embodiments, database system 104 can provide database services to other applications and their users. In certain embodiments, requests for database services can be provided by generating tasks or threads for the requests. For instance, a task generation module 102 can create tasks in response to received requests. Task handler module 106 can then assign the generated tasks to an appropriate database agent, thread or process. In various embodiments, database system 104 can create a pool 112 of database agents 114, 116 and 118 from which tasks can be assigned by the task handler module 106.

One or more of the database agents 114, 116, 118 can provide access to different resources 124, which can include input/output (I/O) resources that allow access to I/O devices 122 and to data storage devices that correspond to one or more databases 126, 130. In certain embodiments, the I/O devices can provide direct access to a database 126. The I/O devices can also provide access over one or more networks 128 using connection protocols, such as Transmission Control Protocol and the Internet Protocol (TCP/IP), to connect to remote databases 130.

According to embodiments, the database agents 114, 116, 118, or their corresponding threads or processes, can be subject to temporary or permanent blocking conditions. The complex nature of the database system 104 may lend itself to a wide variety of different blocking conditions. Moreover, the immediate blocking condition for a particular thread may not be the root cause of the block. This can happen, for instance, due to interdependencies between multiple threads. Embodiments of the present disclosure are directed toward monitor task 108 being configured to identify thread interdependencies in order to identify a blocking thread that is the cause of the congestion for one or more other threads or tasks.

For instance, monitor task 108 can first identify a database agent 114, 116, 118 that is hung. This identification can be accomplished in a variety of manners including, but not limited to, obtaining monitor data that includes a timeout counter that detects when a thread or agent has remained in a particular wait state for too long. As discussed herein, the timeout counter can be set based upon database system parameters, automatically adjusted based upon statistical analysis, or manually set by a system operator. In certain instances, monitor task 108 can traverse a linked list of database agents 114, 116, 118 to check for blocking conditions by accessing the monitor data, such as a timeout data. This can include a first set of monitor data values in an agent structure that can be interrogated to see if the agent is in a wait. A timestamp for the present the wait can indicate how long the current wait has been in existence. This can be particularly useful for avoiding the need to wait for a timeout by allowing for proactive detection of wait conditions and thereby and taking action accordingly.

Consistent with embodiments, each thread can be interrogated for wait conditions, such as a waiting on a lock, latch (or semaphore), queued work, or I/O device. When a thread suspends or waits for such a condition, the thread can record a timestamp that indicates the beginning of the wait event. If the wait exceeds a threshold, further investigation can be conducted to try to self-heal the condition. According to particular embodiments, the determination of the threshold limit can be (initially) based on system configuration parameters. Consistent with certain embodiments, the threshold limit of can vary based upon feedback from the system, such as the current operating conditions of the database system. The operating conditions may include information such as the existence of a large numbers of threads waiting for the same blocker, which can result in a reduced threshold limit.

While a timeout event may indicate that the particular thread or agent is blocked, the ultimate source (or root cause) of the block may be associated with another thread. For instance, the other thread may be using a resource that the first timed-out thread is waiting to access. Moreover, the other thread may be waiting upon yet another thread and so forth. Accordingly, monitor thread 108 can be configured to evaluate each blocked agent or thread in order to determine is another thread is the blocking thread. This can be accomplished using an iterative process that results in traversing and evaluating monitor data for each of a sequence of threads that are connected through relevant interdependencies. Once a blocking thread has been identified, the monitor thread 108 can take corrective actions.

The identification of threads waiting on a blocking condition can be accomplished in a number of manners, and is not limited to a monitor thread 108 traversing each thread or database agent. For instance, threads can be configured to self monitor for wait conditions that exceed a threshold, and then report the conditions to monitor thread 108. Monitor thread 108 can also sample less than all of the threads at any given time (e.g., using random sampling or sampling only a certain number of threads at a given time). Sampling of only some threads can be particularly useful for reducing overhead associated with monitor thread 108.

It has been recognized that correction of blocking (hang) conditions can be difficult to accomplish with a one-size-fits all approach. For instance, some blocking conditions can be corrected by elevating the priority for the blocking thread. This may allow the blocking thread to gain access to resources that it would otherwise have been precluded from accessing (e.g., due to higher priority threads). This corrective action/solution, however, may not work well for all situations. Moreover, it has been recognized that it can be difficult, or even impossible, to accurately identify the specific reason for the blocking condition. Accordingly, embodiments of the present disclosure are directed toward the use of a set of blocking solutions 120 that can be applied in succession. In particular embodiments, the blocking solutions can be separated into different tiers. If a first blocking solution is not successful, the monitor task can elevate the corrective measures by activating a blocking solution from a higher tier. Ultimately, the monitor task can terminate the database (e.g., if no other blocking solution is effective). The database can then be restarted.

It has been recognized that even for redundant database systems rapid hang detection can be beneficial. Consistent with various embodiments, the database system 104 can be configured as a tightly-coupled cluster of independent instances of an operating system (e.g., a sysplex system or a clustered system). The internal communications within the cluster can be made using a network in which communications protocols such as TCP/IP are used to facilitate availability and load balance. In some instances, the database can include redundancy for one or more resources. Even with redundancy, the database system 104 can still be susceptible to blocking conditions caused by a resource that is shared across different physical members of the cluster. Accordingly, aspects of the present disclosure can be used to quickly detect and correct for such blocking conditions, even across different types of resources (e.g., lock managers, semaphore/latch managers, queued work or I/O devices).

Figure 2:
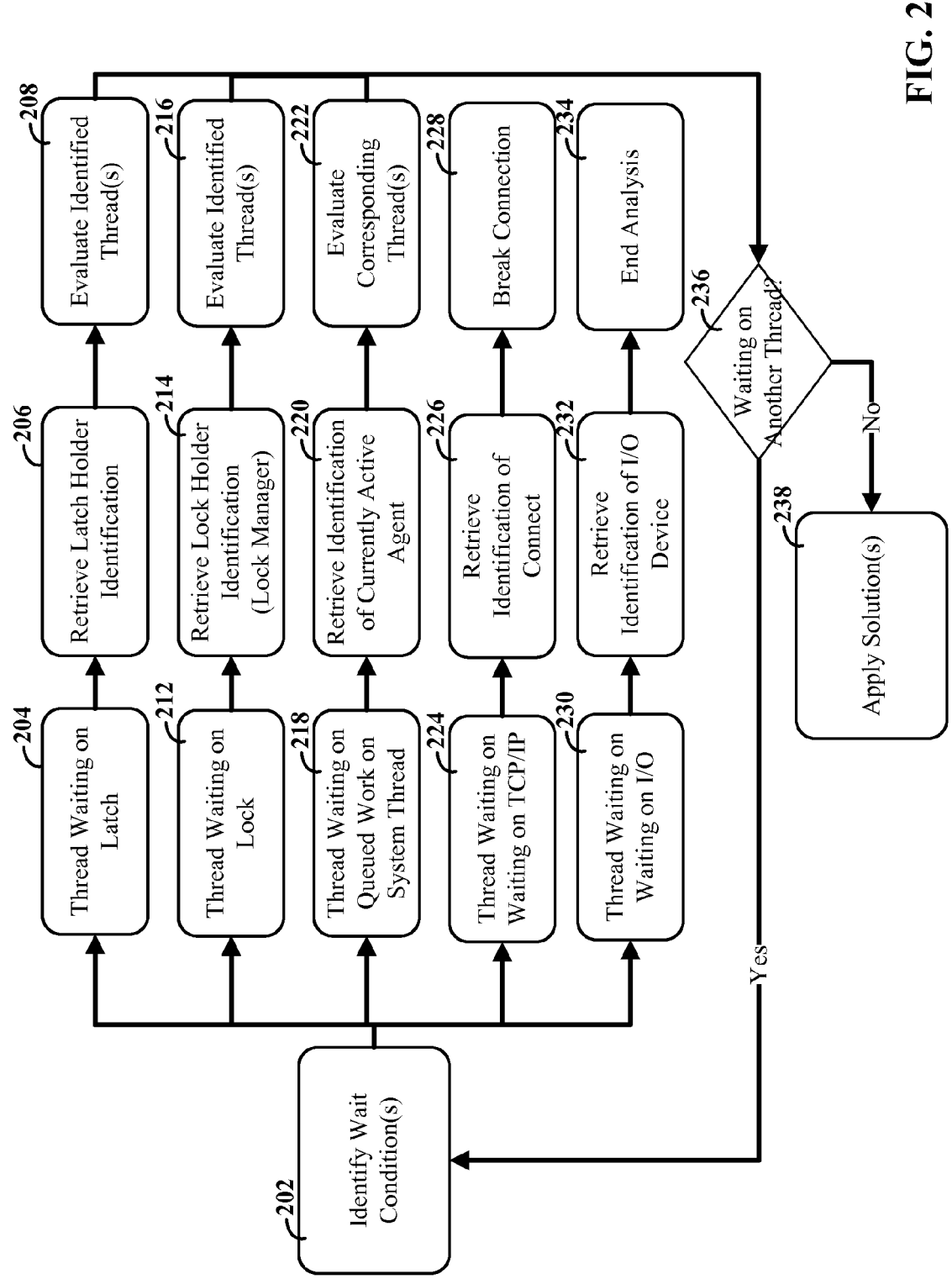
FIG. 2 is a flow diagram for a process of identifying the source of one or more blocking conditions, consistent with embodiments of the present disclosure.

FIG. 2 is a flow diagram for a process of identifying the source of one or more blocking conditions, consistent with embodiments of the present disclosure. A thread can first be identified as being blocked using by monitor data for the thread, e.g., the thread wait time exceeding a threshold level. The process can then attempt to identify the source or type of wait condition from monitor data, as shown by block 202. Depending upon the particular type of wait condition, the process can proceed to the row corresponding to the wait condition. A few example wait conditions are identified by blocks 204, 212, 218, 224 or 230.

Consistent with embodiments, if the thread is waiting for a latch (or semaphore), the process can proceed to block 204. A monitor thread can then retrieve the identification of the holder for the latch, per block 206. This allows the monitor thread to determine which thread is holding the latch that is preventing the current thread from proceeding. The monitor thread can then make the latch holder the current thread and evaluate its condition, per block 208.

The monitor thread can then determine whether or not the current thread (identified in block 206) is waiting on another thread, as shown in block 236. If not, then this thread may be the blocking thread and a blocking solution can be applied per block 238. Is there is another thread, the monitor thread can determine what type of wait condition exists and proceed to the corresponding row.

Another wait condition can include a lock, as depicted in block 212. The monitor thread can identify which thread holds the lock, as shown by block 214. Consistent with various embodiments, the identification 214 can include accessing a lock manager module to ascertain the identity of the lock holder. The monitor thread can then make the latch holder the current thread and evaluate its condition, per block 216. The monitor thread can then proceed to block 236 and proceed as discussed herein.

Yet another wait condition can be queued work on a system thread, as depicted in block 218. The monitor thread can identify the currently active agent, as shown by block 220. Consistent with various embodiments, the currently active agent can be identified as the likely cause of queued work. The monitor thread can then make the currently active agent (and/or its corresponding thread(s)) the current thread and evaluate its condition, per block 222. The monitor thread can then proceed to block 236 and proceed as discussed herein.

In certain instances, a wait condition might be a non-responsive TCP/IP connection, as depicted in block 224. The monitor thread can identify the particular connection, as shown by block 226. The monitor thread can then terminate or break the identified connection, per block 228. This termination can result in the corresponding thread or tasking being ended.

In certain instances, a wait condition might be a non-responsive I/O resource or device, as depicted in block 230. The monitor thread can retrieve the identity of the I/O device, as shown by block 232. This information can be use for reporting or logging of a problem with the identified I/O device. In certain embodiments, the monitor thread may have limited options for dealing with a problematic I/O device. Accordingly, the monitor thread can end the analysis at this time, as shown in block 234.

Figure 3:
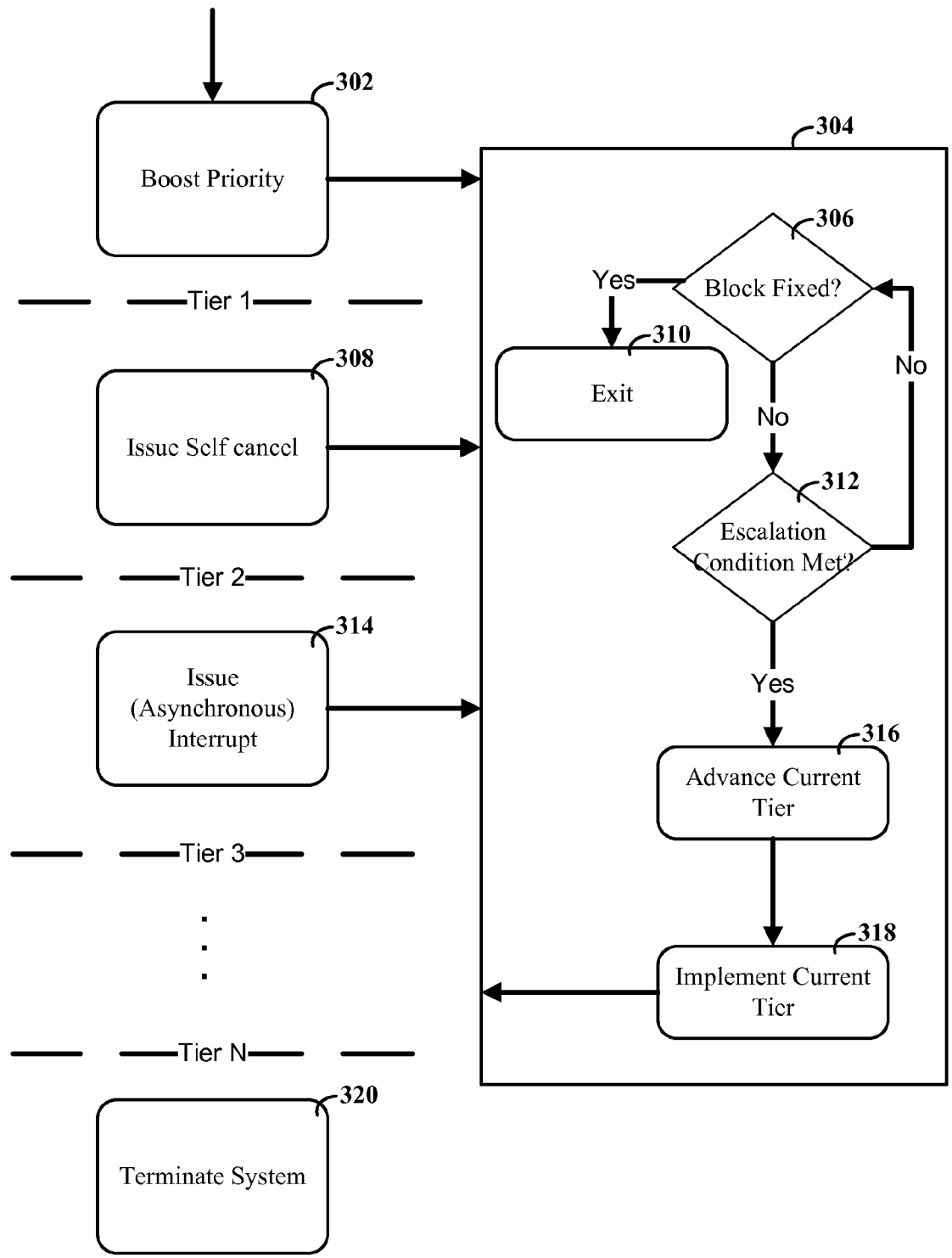
FIG. 3 depicts a flow diagram for blocking solutions, consistent with embodiments of the present disclosure.

FIG. 3 depicts a flow diagram for blocking solutions, consistent with embodiments of the present disclosure. Once blocking thread has been identified, the monitor thread can apply a set of blocking solutions to attempt to fix or mitigate the blocking condition. Consistent with certain embodiments, the set of blocking solutions can contain multiple different actions. Some of these actions can be more useful for addressing certain types of blocking conditions than other types of blocking conditions. In certain instances, the different actions can be arranged in tiers that can be sequentially applied. Various embodiments are directed toward controlling the order of the tier, changing the starting tier level and/or blocking solutions in which the applied tiers are based upon information such as the type of resource under contention.

As shown in FIG. 3, an example of the first tier of solutions can be boosting the priority 302 for the blocking thread. Boosting the priority 302 can be particularly useful for instances where the blocking thread is waiting on a shared resource due to higher priority threads concurrently seeking access to the shared resource. Boosting the priority 302 can allow the blocking thread to gain access to the shared resource and complete its corresponding task. This may succeed if the work is stalled due to a low dispatching priority. Boosting priority 302 may not resolve all blocking conditions, such as where the blocking condition is due to a looping thread.

Other example solutions and associated tiers include the issuance of a self cancel 308, the issuance of an interrupt 314 and the termination of the database system 320. Issuing a self cancel (or a "soft" cancel) 308 against the blocker can be accomplished by setting a cancel bit in the agent structure. Logic within the database system can check the status of this bit, and if set, self terminate and free the contended resources. This may not solve all problems, such as where the blocking thread is not able to execute the self cancel code or the self cancel is blocked for some reason. Issuing an asynchronous interrupt of the blocker 314 may allow the blocking thread to terminate or cancel when the self cancel is inadequate (e.g., either two slow to respond to the self cancel and/or not responding at all). The asynchronous interrupt can cause the blocking thread to jump to an interrupt handling routine which can result in the blocker to terminating and freeing up contended resources. Consistent with embodiments, the use of an asynchronous interrupt can be avoided unless the self cancel has failed because the asynchronous interrupt may be more likely to expose timing related defects in the database system.

If the blocking thread does not respond to the other attempts to clear the contention, the database system may be terminated 320. The termination of the database system 320 can be a relatively drastic step. Accordingly, the system can make the termination contingent upon various factors. For instance, an assessment can be made as to how many agents are being blocked before termination selected. The threshold number of blocked agents can be a predetermined number, assigned by a system user and/or dynamically adjusted based upon system usage and related parameters. If the system is terminated, a core dump can be taken of database system address spaces to aid in post-incident diagnosis.

Consistent with embodiments if the present disclosure, it is recognized that any one particular blocking solution, such as boosting priority, may not solve all blocking conditions. Accordingly, a blocking solution algorithm 304 can be applied in order to control when another blocking solution can be attempted. At block 306, the monitor agent can determine whether or not the blocking condition has been fixed. If the blocking solution has been fixed, then the blocking solution algorithm 304 can be exited 310. If the blocking solution has not been fixed, then the monitor agent can determine wither or not an escalation condition has been met 312.

In embodiments, the escalation condition can be the expiration of a timer. The length of the timer can be set according to a variety of factors. A few example factors include the type of current blocking solution that is being applied and the type of blocking condition. For instance, a priority boost may be given more time than a self cancel or vice versa. Other escalation conditions are possible including, but not necessarily limited to, detecting that the effect of the blocking condition has worsened (e.g., additional threads or tasks are being blocked).

If the escalation condition has not been met, the process can return to block 306. If the escalation condition has been met, the current blocking solution tier can be advanced or increased 316. The current blocking solution tier can then be implemented 318.

Consistent with certain embodiment, the monitor task(s) can monitor threads or tasks queued for entry into the database management system. The system can be configured to support static configuration parameters that place a limit on the number of threads that can run in the system concurrently. This static parameter may not be sufficiently high to handle application workload spikes. The monitor tasks can determine if sufficient capacity exists and may increase or extend the thread limits to mitigate queuing delays.

According to various embodiments, aberrant conditions found by the monitor tasks can be recorded in instrumentation statistics records that can be post-processed and/or monitored real-time via a database interface. In addition, console message can be written describing the blocking agents. The monitor task can also report to the operating system that the database system has problems so that less work can be directed to this database system (e.g., where there are multiple database systems capable of handling similar work/requests). Health might be restored over a period of time even if no contention is accurately identified. The monitor task can also be configured to increase the frequency at which the task monitors for blocking conditions in response to detecting resource contention. This increase in monitor frequency can be based upon an assumption that further action is more likely, and therefore, the system can be temporarily checked for blocking conditions at a higher frequency than normal.

Consistent with embodiments, blocking solution algorithm 304 can be conducted over established intervals based on the type of resource being held. For example, a long wait on a semaphore can be shorter than a long wait on a lock. For certain database systems, the timeout value for an escalation condition can be established using one or more system parameters that can be defined by the user. The timeout can be resource dependent, e.g., a multi-second I/O delay could be considered outside the bounds of normal. The blocking solution algorithm 304 can also uses various system information to determine how long to wait before moving to the next tier (e.g., a semaphore may be expected to be released within seconds of a priority boost).

Consistent with certain embodiments, the database system can be configured to store information about the blocking threads and the effectiveness of blocking solutions. A statistical analysis of such information can then be used to adjust how the system operates. For instance, the system may analyze the data to determine that, once priority has been boosted for a certain amount of time (e.g., 2 seconds) the blocking condition is seldom fixed by waiting longer (e.g., less than 5% of the time). Accordingly, the database system can use this analysis to reduce the length for a timeout condition for priority boosting (e.g., to around 2 seconds). Once the timeout condition is satisfied (e.g., the priority boosting fails to work), another blocking condition can be applied. This can be particularly useful for reducing the amount of time spent waiting for the priority boost to fix the blocking time before moving on to another blocking solution, without significantly reducing in the effectiveness of the priority boost. This adjustment of the timeout condition can be made for different blocking solutions and can also take into consideration other factors, such as correlating other information (e.g., thread type and/or current system load) with the timing information. Moreover, the system can adjust other aspects, such as the blocking solution order. For instance, different blocking solutions can be assigned to different tiers based upon their respective effectiveness.

Figure 4:
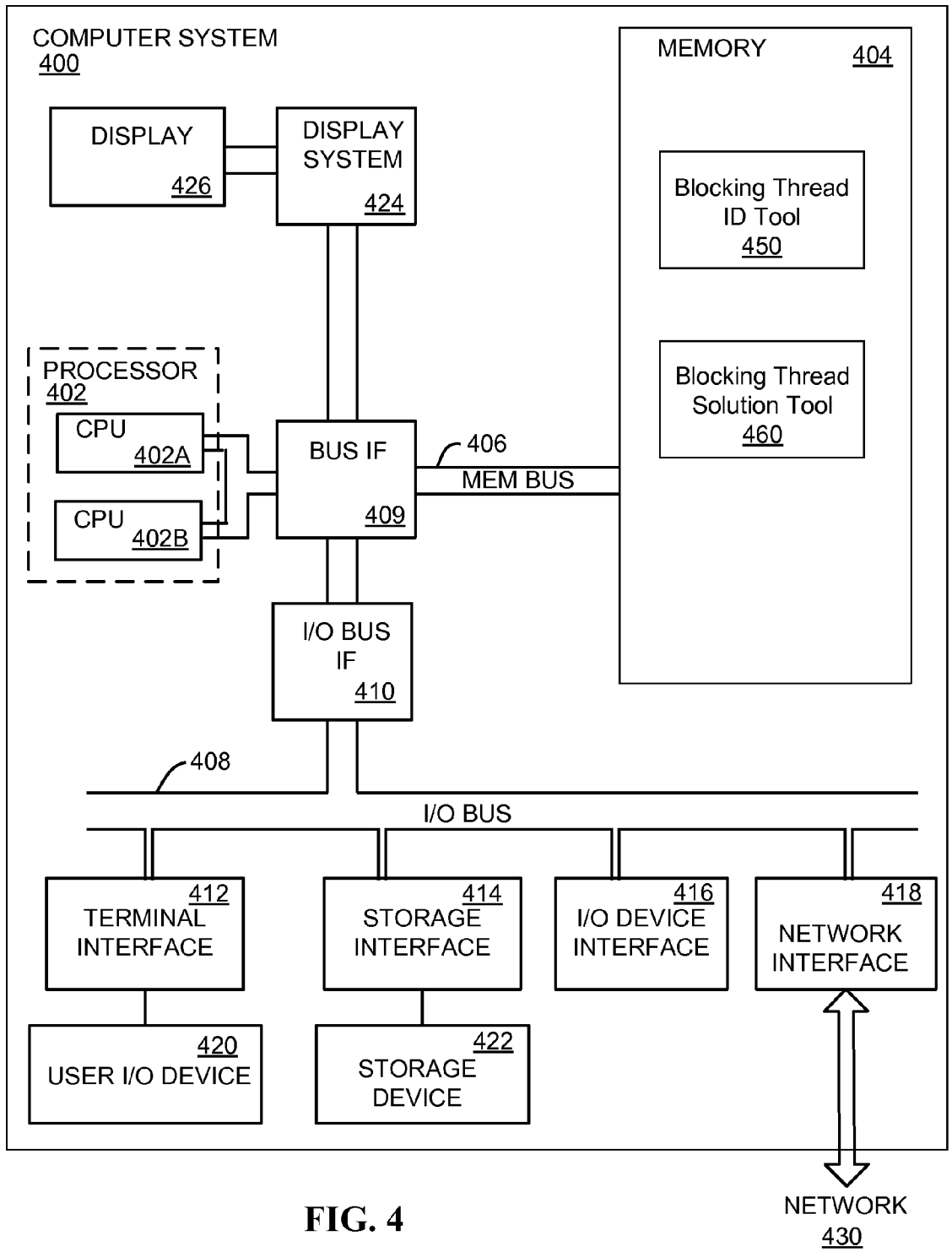
FIG. 4 depicts a high-level block diagram of an exemplary computer system 400 for implementing various embodiments.

FIG. 4 depicts a high-level block diagram of an exemplary computer system 400 for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, and/or storage medium (either volatile or non-volatile) for storing and/or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store blocking thread identification (ID) tool or module 450 and/or blocking thread solution tool or module 460. Consistent with certain embodiments, these tools can be implemented as part of one or more monitor threads. These programs and data structures are illustrated as being included within the memory 404 in the computer system 400, however, in other embodiments, some or all of them may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the blocking thread ID tool 450 and the blocking thread solution tool 460 are illustrated as being included within the memory 404, these components are not necessarily all completely contained in the same storage device at the same time. Further, although the blocking thread ID tool 450 and the blocking thread solution tool 460 are illustrated as being separate entities, in other embodiments some of them, portions of some of them, or all of them may be packaged together (e.g., as part of the same monitor thread).

In embodiments, the blocking thread ID tool 450 and the blocking thread solution tool 460 may include instructions or statements that execute on the processor 402 or instructions or statements that are interpreted by instructions or statements that execute on the processor 402 to carry out the functions as further described below. In certain embodiments, the blocking thread ID tool 450 and the blocking thread solution tool 460 can be implemented in hardware via semiconductor devices, chips, logical gates, circuits, circuit cards, and/or other physical hardware devices in lieu of, or in addition to, a processor-based system. In embodiments, the blocking thread ID tool 450 and the blocking thread solution tool 460 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts a representative of certain major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A method for managing threads designed to access resources for a database system and subject to a plurality of disparate bottleneck conditions for resources, the method comprising using at least one monitor thread to:
    retrieve, from a first thread, first monitor data for a first bottleneck condition of a first type, wherein the first monitor data comprises a first total wait time of the first thread at the first bottleneck condition, wherein the first total wait time begins when the first thread records a first time stamp that indicates the beginning of a first wait at the first bottleneck condition and ends when the at least one monitor thread collects the first monitor data;
    compare the first monitor data to a trigger level for the bottleneck condition;
    determine, in response to the comparison of the first monitor data to the trigger level, a potential source of the first bottleneck condition;
    identify a potential blocker thread based upon the potential source of the first bottleneck condition;

retrieve, from the potential blocker thread, second monitor data for a second type of bottleneck condition that is different from the first type of bottleneck condition, wherein the second monitor data comprises a second total wait time of the potential blocker thread at the second bottleneck condition, wherein the second total wait time begins when the potential blocker thread records a second time stamp that indicates the beginning of a second wait at the second bottleneck condition and ends when the at least one monitor thread collects the second monitor data;

identify thread interdependencies between the first bottleneck condition and the second bottleneck condition;

identify, in response to the identifying thread interdependencies between the first bottleneck condition and the second bottleneck condition and based upon the identified thread interdependencies, a blocking thread causing at least in part the first bottleneck condition; and apply a particular blocking solution to the blocking thread.

2. The method of claim 1, wherein the at least one monitor thread sequentially applies a plurality of tiered blocking solutions to the blocking thread.

3. The method of claim 2, wherein the tiered blocking solutions include at least two selected from a group consisting of: issuing a priority boost against the blocking thread, issuing a self cancel request to against the blocking thread, issuing an interrupt against the blocker, extending thread limits and terminating the database system.

4. The method of claim 1, wherein the first and second bottleneck conditions each include a respective and different condition from a set of conditions consisting of: a latch, a lock, a queued thread, a database network request and an input/output device.

5. The method of claim 1, the method further comprising:
detecting a timeout condition, based on stored information from analyzing previously applied blocking solutions, for the particular blocking solution; and
applying, in response to detecting the timeout condition is satisfied, a second blocking solution to the blocking thread.

6. The method of claim 5, the method further comprising:
storing information relating to an effectiveness of the applied blocking solutions;
analyzing the stored information for timing information; and
adjusting the timeout condition for the particular blocking solution based on results obtained from analyzing the stored information.

7. The method of claim 1, wherein the particular blocking solution includes termination of the database system in response to a contingent condition.

8. The method of claim 7, wherein the contingent condition includes exceeding a threshold number of blocked agents.

9. The method of claim 7, the method further comprising taking a core dump of the database system address spaces.

10. The method of claim 1, wherein the at least one monitor thread sequentially applies a plurality of tiered blocking solutions to the blocking thread, the method further comprising;
issuing a priority boost against the blocking thread;
issuing, in response to detecting a timeout condition for a priority boost is satisfied, a self-cancel request against the blocking thread;
issuing in response to detecting a timeout condition for an issued self-cancel request is satisfied, an interrupt against the blocker;
extending, in response to detecting a timeout condition for an issued interrupt is satisfied, thread limits; and
terminating in response to detecting a timeout condition for an extended thread limit is satisfied, the database system.

11. The method of claim 1, the method further comprising:
identify a second potential blocker thread based upon the potential source;
retrieve, from the second potential blocker thread, third monitor data for a third type of bottleneck condition that is different from the first type of bottleneck condition and the second type of bottleneck condition, wherein the third monitor data comprises a third total wait time of the second potential blocker thread at the third bottleneck condition, wherein the third total wait time begins when the second potential blocker thread records a third time stamp that indicates the beginning of a third wait at the third bottleneck condition and ends when the at least one monitor thread collects the third monitor data;
identify thread interdependencies between the first bottleneck condition and the third bottleneck condition;
identify, based upon the identifying thread interdependencies between the first bottleneck condition and the third bottleneck condition, a second blocking thread causing at least in part the first bottleneck condition; and
apply a second particular blocking solution to the second blocking thread.

12. The method of claim 6, wherein the adjusting the timeout condition for the particular blocking solution is manually set by a system operator.

13. The method of claim 5, wherein the particular blocking solution is a priority boost to the blocking thread and the second blocking solution is a self-cancel instruction to the blocking thread.

14. The method of claim 1, wherein the trigger level is initially determined based on system configurations.

* * * * *